(12) United States Patent
Liau et al.

(10) Patent No.: US 10,712,600 B1
(45) Date of Patent: Jul. 14, 2020

(54) DISPLAY DEVICE WITH PROTRUDING STRUCTURE ON FRAME THEREOF

(71) Applicant: AU Optronics Corporation, Hsin-Chu (TW)

(72) Inventors: Guo-Tsai Liau, Hsin-Chu (TW); Cheng-Min Tsai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/362,765

(22) Filed: Mar. 25, 2019

(30) Foreign Application Priority Data

Dec. 28, 2018 (TW) .............................. 107147866 A

(51) Int. Cl.
*G02F 1/1333* (2006.01)
*H05K 5/00* (2006.01)

(52) U.S. Cl.
CPC ..... *G02F 1/133308* (2013.01); *H05K 5/0017* (2013.01); *G02F 2001/133314* (2013.01); *G02F 2001/133317* (2013.01); *G02F 2001/133334* (2013.01); *G02F 2202/28* (2013.01)

(58) Field of Classification Search
CPC ... G02F 1/133308; G02F 2001/133317; G02F 2001/133314; G02F 2001/133334; G02F 2001/133322; G02F 2202/28; H05K 5/0017; G06F 1/1601; G06F 1/1637; G06F 1/1656

See application file for complete search history.

(56) References Cited

U.S. PATENT DOCUMENTS

| | | | | |
|---|---|---|---|---|
| 7,488,901 | B2 * | 2/2009 | Arnold | H05K 9/0024 174/377 |
| 8,011,822 | B1 * | 9/2011 | Lee | G02F 1/133608 349/58 |
| 8,487,887 | B2 * | 7/2013 | Yu | G06F 3/0428 345/173 |
| 2014/0315016 | A1 | 10/2014 | Dollase et al. | |

FOREIGN PATENT DOCUMENTS

| | | |
|---|---|---|
| CN | 202473132 U | 10/2012 |
| TW | M327043 U | 2/2008 |
| TW | I456313 B | 10/2014 |

* cited by examiner

*Primary Examiner* — James Wu
(74) *Attorney, Agent, or Firm* — WPAT, PC

(57) ABSTRACT

A display device includes a display pane, a frame, a first protruding structure, and an adhesive structure. The display panel has a display surface. The frame surrounds the display panel and has an opening. The first protruding structure is connected to and protrudes from the frame, in which the first protruding structure and the display surface are located at the same side of the frame and the display panel. The adhesive structure adheres to the display surface of the display panel, a top surface of the first protruding structure opposite to the frame, and the frame.

9 Claims, 15 Drawing Sheets

DISPLAY DEVICE WITH PROTRUDING STRUCTURE ON FRAME THEREOF

CROSS-REFERENCE TO RELATED APPLICATION

This application claims priority to Taiwan Application Serial Number 107147866, filed Dec. 28, 2018, which is herein incorporated by reference in its entirety.

BACKGROUND

Field of Invention

The present disclosure relates to a display device.

Description of Related Art

Due to the prevalence of touch-operated interfaces, touch-sensitive displays that combine touch technologies with displays have been widely used. A typical touch display system includes a backlight module, a display panel, a front frame, and a touch panel which are sequentially disposed. Generally, the touch display is fixed by fitting a plurality of frames to each other.

SUMMARY

The disclosure provides a display device. The display device includes a display panel, a frame, a first protruding structure, and an adhesive structure. The display panel has a display surface. The frame surrounds the display panel and has an opening. The first protruding structure is connected to and protrudes from the frame, in which the first protruding structure and the display surface are located at the same side of the frame and the display panel. The adhesive structure adheres to the display surface of the display panel, a top surface of the first protruding structure opposite to the frame, and the frame.

In some embodiments of the present disclosure, the first protruding structure has a side surface does not contact the adhesive structure.

In some embodiments of the present disclosure, the display device further includes a second protruding structure connected to and protruding from the frame. A portion of the frame between the first and second protruding structure does not contact the adhesive structure.

In some embodiments of the present disclosure, a first coefficient of thermal expansion of the display panel is smaller than a second coefficient of thermal expansion of the frame.

In some embodiments of the present disclosure, the first protruding structure is a strip protrusion substantially extending along an inner edge of the opening.

In some embodiments of the present disclosure, the first protruding structure is a strip protrusion substantially extending along a first direction intersecting an inner edge of the opening.

In some embodiments of the present disclosure, the display device further includes another strip protrusion substantially extending along a second direction intersecting the inner edge of the opening. The first direction intersects the inner edge of the opening at a first angle. The second direction intersects the inner edge of the opening at a second angle. The first angle is substantially the same as the second angle.

In some embodiments of the present disclosure, the first direction is substantially perpendicular to the inner edge of the opening.

In some embodiments of the present disclosure, a first height of the first protruding structure relative to the frame is substantially equal to or smaller than a second height of the display panel relative to the frame.

In some embodiments of the present disclosure, a thickness of the adhesive structure is smaller than a height of the first protruding structure relative to the frame.

In some embodiments of the present disclosure, the adhesive structure includes an adhesive layer, a first molding layer, an electromagnetic shielding layer, and an insulating layer which are sequentially stacked on each other. The adhesive layer of the adhesive structure adheres to the display surface of the display panel, the top surface of the first protruding structure, and the frame.

In some embodiments of the present disclosure, the first molding layer is a fiber structure.

In some embodiments of the present disclosure, the adhesive structure further includes a second molding layer between the electromagnetic shielding layer, and the insulating layer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
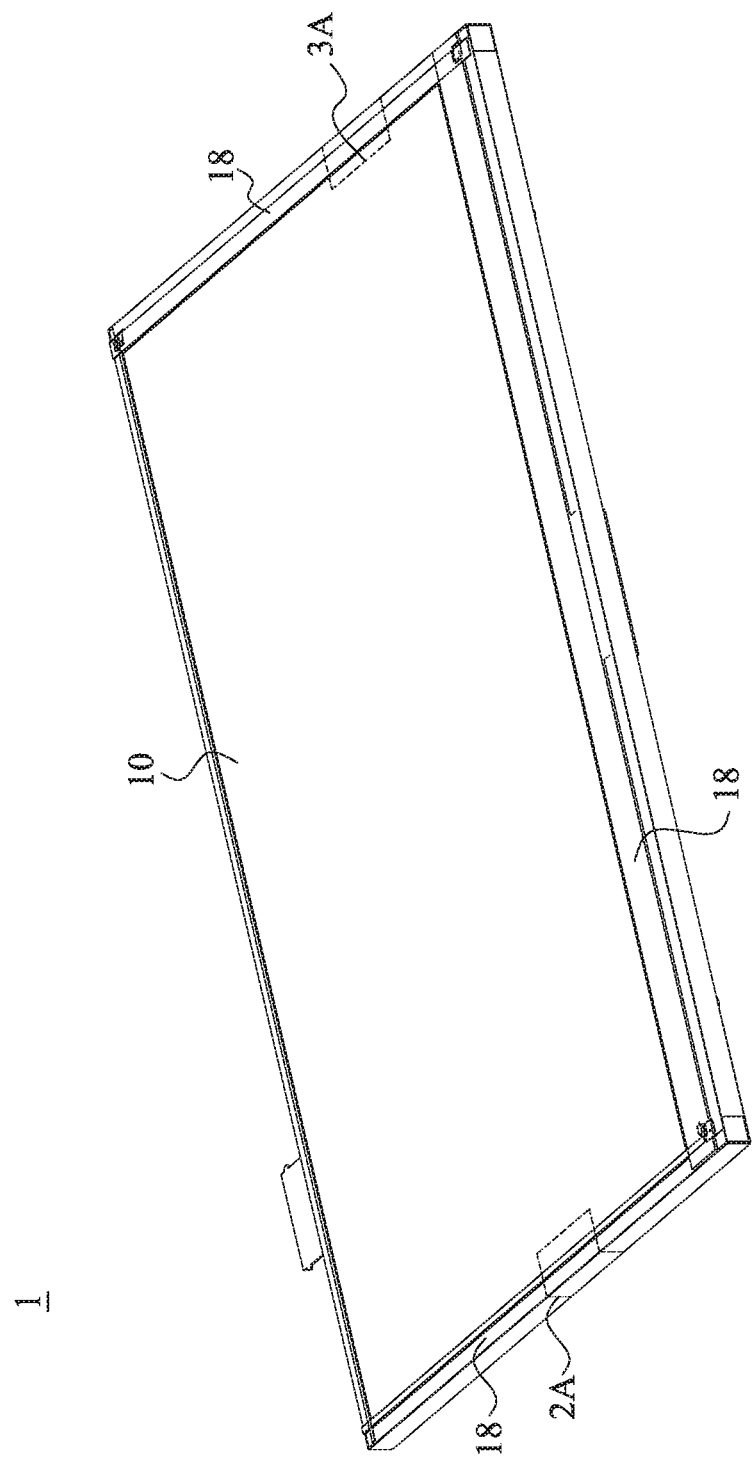
FIGS. 1A and 1B are perspective views showing a display device in accordance with some embodiments of the present disclosure, in which FIG. 1B omits an adhesive structure as shown in FIG. 1A.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
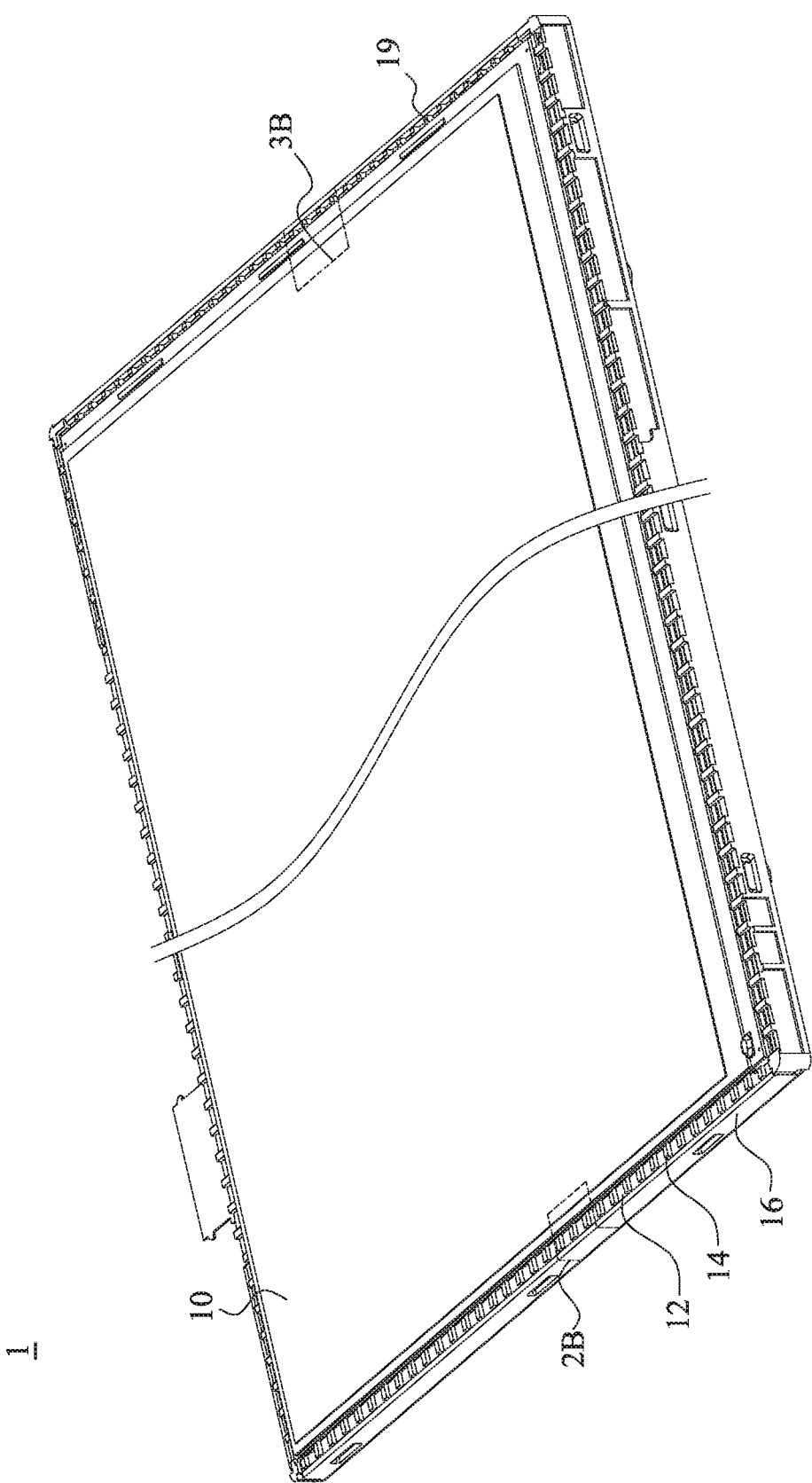
Figure 2A:
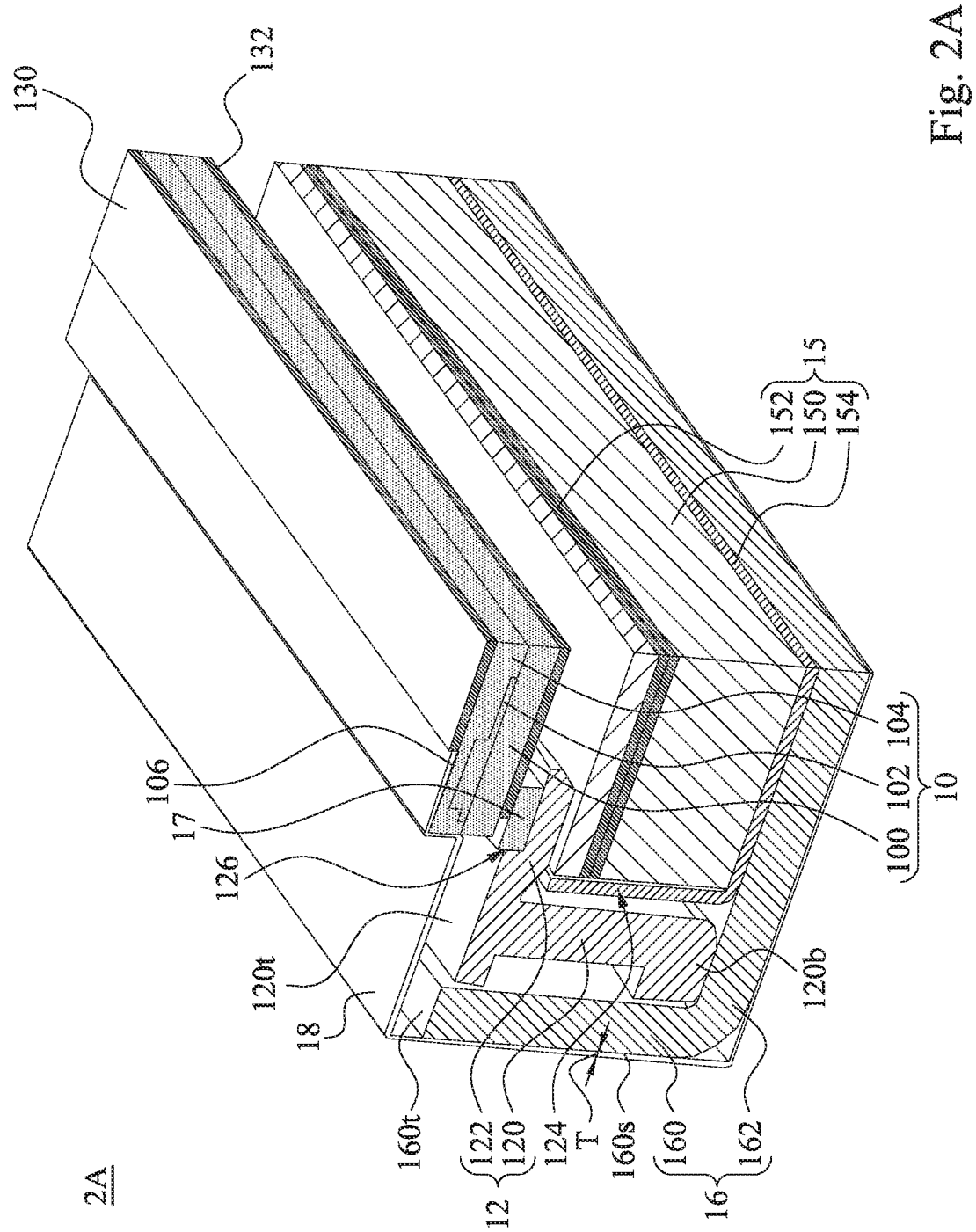
FIG. 2A is a partial perspective cross-sectional view taken along broken line 2A in FIG. 1A.
Figure 2B:
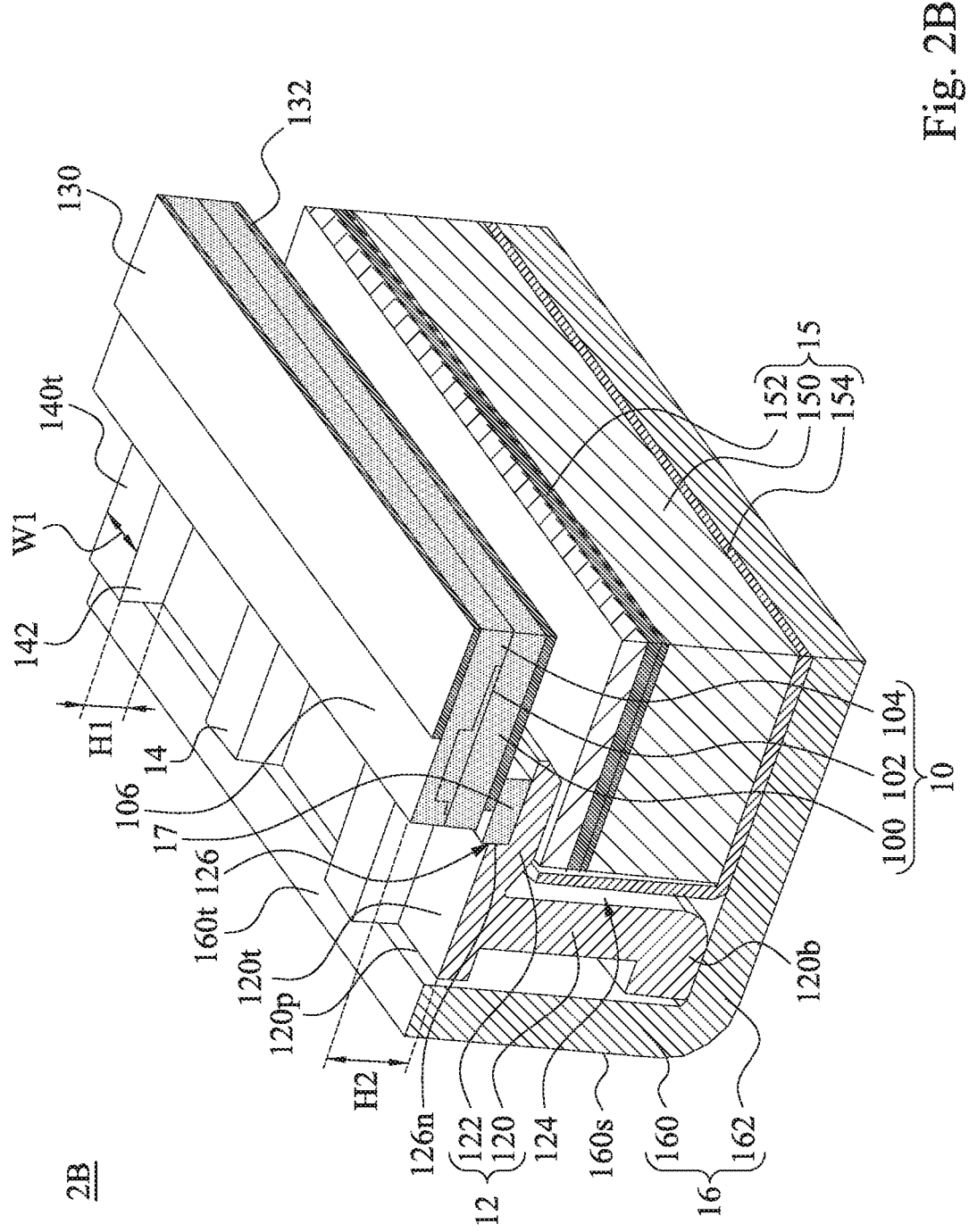
FIG. 2B is a partial perspective cross-sectional view taken along a broken line 2B in FIG. 1B.
Figure 3A:
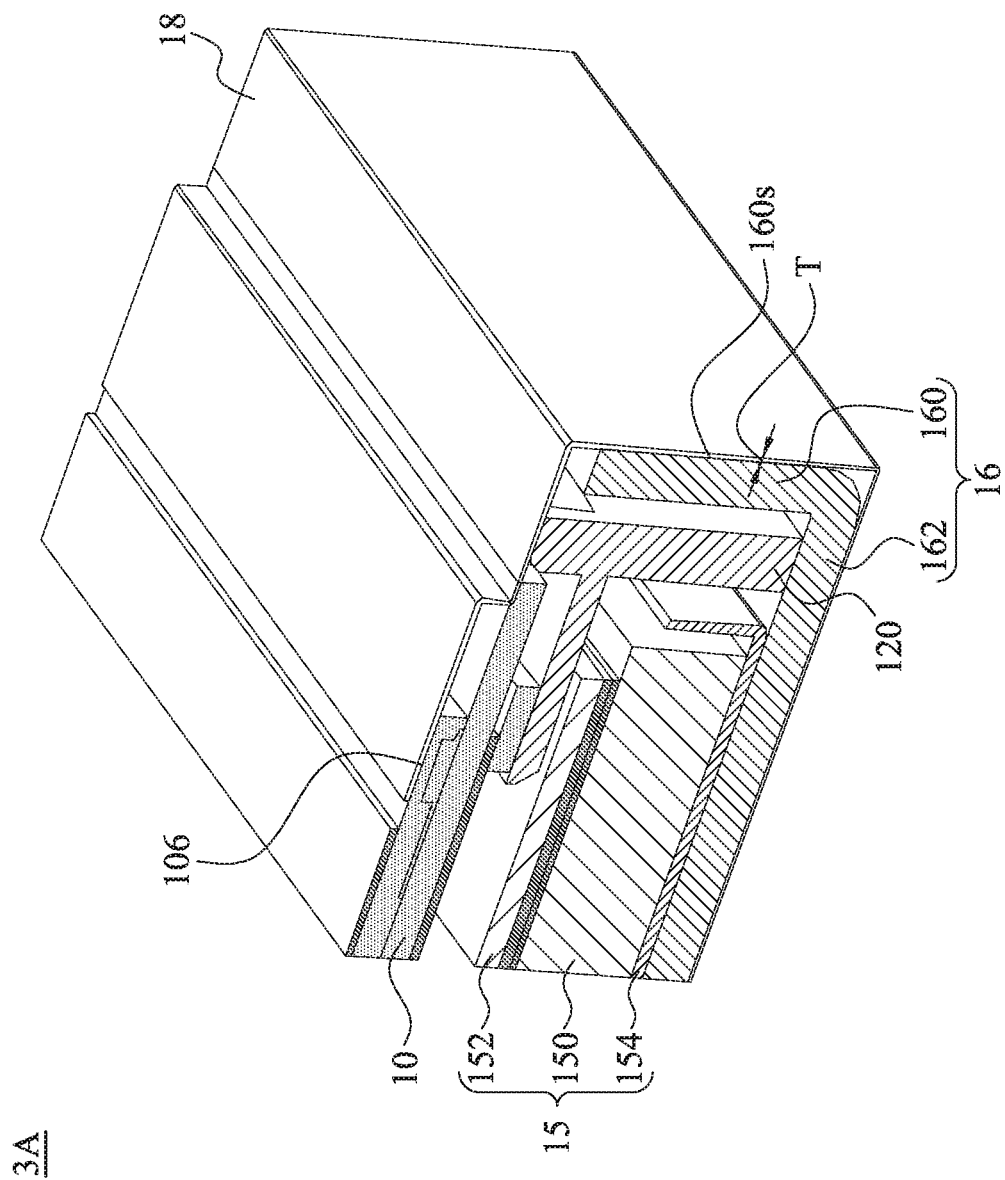
FIG. 3A is a partial perspective cross-sectional view taken along a broken line 3A in FIG. 1A.
Figure 3B:
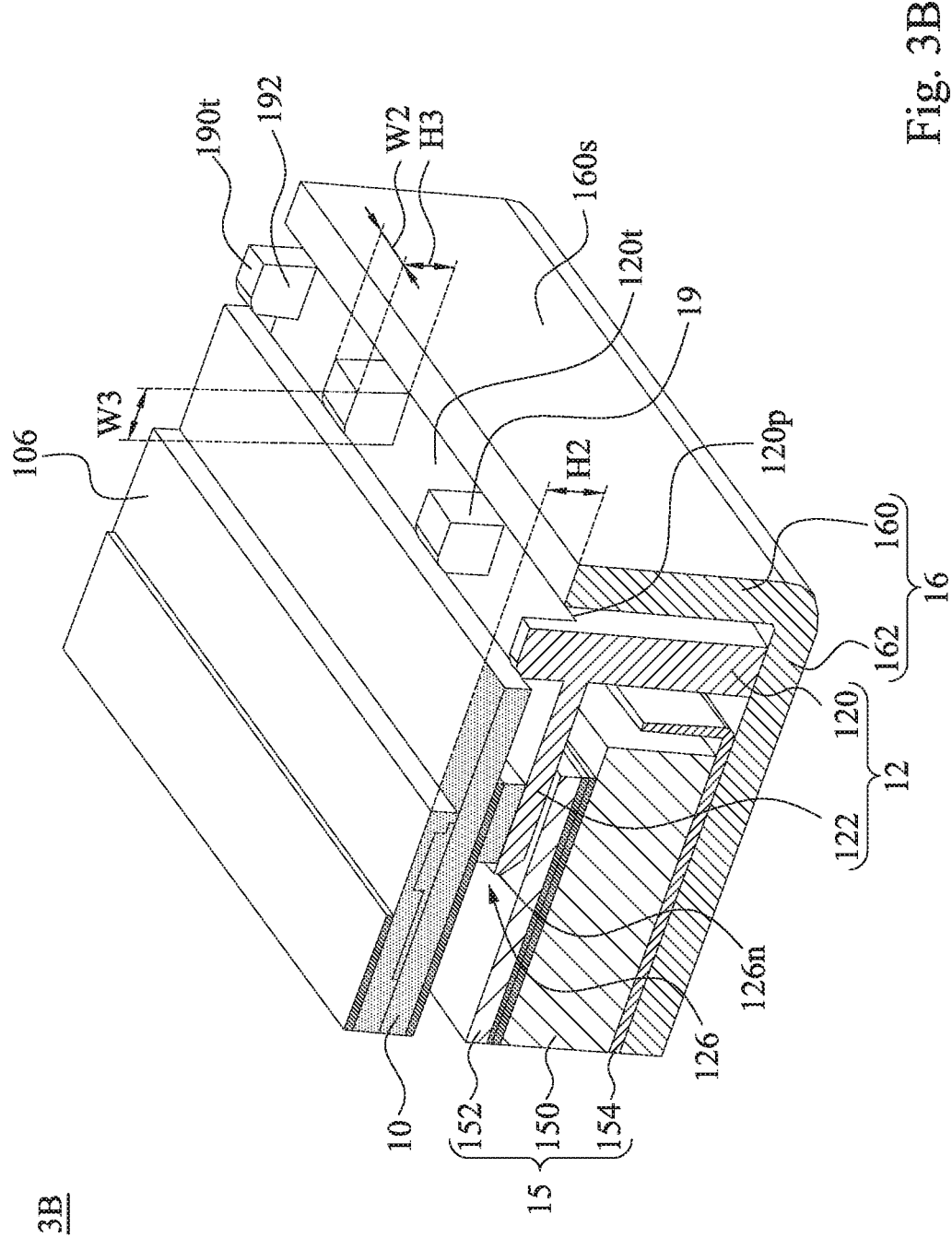
FIG. 3B is a partial perspective cross-sectional view taken along broken line 3B in FIG. 1B.

Reference is made to FIGS. 1A, 1B, 2A, 2B, 3A, and 3B. FIGS. 1A and 1B are perspective views showing a display device 1 in accordance with some embodiments of the present disclosure, in which FIG. 1B omits an adhesive structure 18 as shown in FIG. 1A. FIG. 2A is a partial perspective cross-sectional view taken along broken a line 2A in FIG. 1A. FIG. 2B is a partial perspective cross-sectional view taken along a broken line 2B in FIG. 1B. FIG. 3A is a partial perspective cross-sectional view taken along a broken line 3A in FIG. 1A. FIG. 3B is a partial perspective cross-sectional view taken along a broken line 3B in FIG. 1B.

As shown in FIGS. 2A and 2B, in some embodiments, the display device 1 includes a display panel 10, a frame 12, at least one protruding structure 14 (see FIG. 2A) connected to and protruding from the frame 12, a first substrate 130, a second substrate 132, a backlight module 15, and a housing 16. The structures and functions of the elements and the relationship therebetween are described in detail hereinafter.

In FIGS. 2A and 2B, the display panel 10 includes an array substrate 100, a display medium 102, and a light filter layer 104. The display medium 102 is disposed between the array substrate 100 and the light filter 104. The display panel 10 has a display surface 106. In some embodiments, the display surface 106 of the display panel 104 may be a surface of the light layer 104 located away from the substrate 100, but the present disclosure is not limited thereto. In some embodiments, the display surface 106 also may be a surface of the display panel 10 facing an user or a surface of the display panel located away from the backlight module 15. In some embodiments, the display medium 102 may be a liquid crystal display medium. In some embodiments, the backlight module 15 (including the light guiding plate 150, the optical film 152, and the reflective layer 154) may provide the light source required for the display panel 10 because the liquid crystal display medium cannot emit light by itself.

In FIG. 2A and FIG. 2B, the first substrate 130 covers the light filter 104 of the display panel 10. The second substrate 132 is located below the array substrate 104 of the display panel 10. In some embodiments, the first substrate 130 may include an upper polarizer (not shown), and the second substrate 132 may include a lower polarizer (not shown). In addition, if the display panel 10 is a self-illuminating display panel (for example, an organic electroluminescent display panel, a reflective display panel, an electrophoretic display panel, etc.), the display panel 10 may omit the backlight module.

In FIGS. 1B, 2A, and 2B, the frame 12 includes a sidewall 120 and a supporting portion 122. The sidewall 120 of the frame 12 surrounds and forms an accommodating space 124 and an opening 126 that allows the accommodating space 124 to communicate with the outside of the frame 12. The backlight module 15 is located in the accommodating space 124. The supporting portion 122 of the frame 12 protrudes from the sidewall 120 toward the accommodating space 124. The display panel 10 is supported by the supporting portion 122 of the frame 12.

In some embodiments, a top surface 120t of the sidewall 120 of the frame 12 is lower than the display surface 106, but the present disclosure is not limited thereto. In some embodiments, a height of the top surface 120t of the sidewall 120 of the frame 12 relative to a bottom plate 162 of the housing 16 is substantially the same as a height of the display surface 106 relative to the bottom plate 162 of the housing 16. In some embodiments, the display panel 10 is attached to the frame 12 through the connecting structure 17. The connecting structure 17 may be, for example, a double-sided tape or other suitable material, but the present disclosure is not limited thereto.

In FIGS. 2A and 2B, the housing 16 includes the bottom plate 162 and a sidewall 160 surrounding the bottom plate 162. The frame 12 is disposed in the housing 16. A bottom portion 120b of the frame 12 located away from the protruding structure 14 is supported by the bottom plate 162 of the housing 16. In some embodiments, a top surface 160t of the sidewall 160 of the housing 16 is higher than the top surface 120t of the sidewall 120 of the frame 12, but the present disclosure is not limited thereto. In some embodiments, a height of the top surface 160t of the sidewall 160 of the housing 16 relative to the bottom plate 162 is substantially the same as a height of the top surface 120t of the sidewall 120 of the frame 12 relative to the bottom plate 162 of the housing 16.

In FIG. 2B, the protruding structure 14 and the display surface 106 are located at the same side of the frame 12 and the display panel 10. In some embodiments, the protruding structure 14 may be a strip protrusion, and extends in a direction substantially perpendicular to an inner edge 126n of the opening 126 of the frame 12 and from the opening 126 to an outer edge 120o of the top surface 120t of the sidewall 120. In some embodiments, the strip protrusion 14 has a height H1 relative to the top surface 120t of the frame 12, and the height H1 is substantially equal to or lower than a height H2 of the display panel 10 relative to the top surface 120t of the frame 12. Therefore, when the adhesive structure 18 as shown in FIG. 2A adheres to the frame 12 and the display panel 10 by the protruding structure 14, the adhesive structure 18 may further press the display panel 10 against the frame 12, thereby improving the stability of the overall structure of the display device 1. Furthermore, in the process of bonding the display panel 10 to the frame 12, the relationship between the protruding structure 14 and the frame 12 also contributes to the bonding, thereby improving the convenience of the display device 1 at the time of assembly.

In some embodiments, the height H1 of the protruding structure 14 relative to the top surface 120t of the frame 12 is higher than a height of the sidewall 160 of the housing 16 relative to the top surface 120t of the frame 12, but the present disclosure is not limited thereto. For example, a height of the protruding structure 14 relative to the top surface 120t of the frame 12 may be substantially equal to the sidewall 160 of the housing 16 relative to the top surface 120t of the frame 12. Therefore, when the adhesive structure 18 as shown in FIG. 2A adheres to the frame 12 and the housing 16 by the protruding structure 14, the adhesive structure 18 may further press the frame 12 against the housing 16, thereby improving the stability of the overall structure of the display device 1.

In some embodiments, the protruding structure 14 has a width W1 in a direction along the inner edge 126n of opening 126. In some embodiments, a distance between two adjacent protruding structures 14 is greater than about the width W1, but the present disclosure is not limited thereto. For example, the distance between the two adjacent protruding structures 14 may be about twice of the width W1. In some embodiments, an area of a vertical projection of the protruding structures 14 on the top surface 120t of the frame 12 is smaller than about one half of an area of the top surface 120t, but the present disclosure is not limited thereto. For example, the area of the vertical projection of the protruding structures 14 on the top surface 120t of the frame 12 may be about one third of the area of the top surface 120t.

Since the thermal expansion coefficient of the frame 12 is greater than the thermal expansion coefficient of the display panel 10 as shown in FIG. 2A, when the adhesive structure 18 is adhered to the protruding structure 14 and the display device 1 is at a non-room temperature, the frame 12 and the display panel 10 will push against each other through the adhesive structure 18, thus breaking a connection between the display panel 10, the frame 12 and/or the adhesive structure 18. In some embodiments, a contact area between the adhesive structure 18 and the frame 12 may be reduced by the protruding structure 14 on the frame 12, so as to reduce the difference between a contact area between the adhesive structure 18 and the display panel 10 and that between the adhesive structure 18 and the frame 12, such that the chances of the adhesive structures 18 being separated (peeled off) from the display panel 10, the protruding structure 14, and the housing 16 may be reduced, thereby improving the strength of the overall structure of the display device 1 at the non-room temperature.

In some embodiments, the protruding structure 14 has a side surface 142. The side surface 142 of the protruding structure 14 is not in contact with the adhesive structure 18 (see FIG. 2A). In addition, a portion of the frame 12 between the two adjacent protruding structures 14 is not in contact with the adhesive structure 18 (see FIG. 2A). In some embodiments, the adhesive structure 18 may be a layered structure.

In FIG. 2B, the adhesive structure 18 as shown in FIG. 2A is sequentially adhered to the display surface 106 of the display panel 10, a top surface 140t of the protruding structure 14 located away from the frame 12, a side surface 160s of the sidewall 160, and the bottom plate 162 of the housing 16. A thickness T (see FIG. 2A) of the adhesive structure 18 is smaller than the height H1 of the protruding structure 14 relative to the frame 12, thereby preventing the adhesive structure 18 from contacting the top surface 120t of the sidewall 120.

In some embodiments, the adhesive structure 18 simultaneously covers the display panel 10 and the protruding structure 14 on the frame 12, such that the display panel 10 is connected to the frame 12 by the adhesive structure 18. In some embodiments, the display device 1 having the adhesive structure 18 and the protruding structure 14 may prevent wrinkles, shrinkage or peeling from occurring on the adhesive structure 18 after a reliability test (RAT). For example, the reliability test includes a temperature/humidity storage test (TST), a high temperature storage test (HTS) or any other suitable tests.

In FIG. 3B, the display device further includes protruding structures 19. The protruding structures 19 and the display surface 106 are located at the same side of the frame 12 and the display panel 10. In some embodiments, the protruding structures 19 may be strip protrusions respectively and are arranged substantially along an outer edge 120p of the top surface 120t of the sidewall 120.

Specifically, each of the protruding structure 19 has a width W2 in a direction along the outer edge 120p. In some embodiments, a distance between two adjacent protruding structures 19 is greater than the width W2, but the present disclosure is not limited thereto. For example, the distance between the two adjacent protruding structures 19 may be about twice of the width W2. Further, the protruding structure 19 has a width W3 in a direction substantially perpendicular to the outer edge 120p. In some embodiments, a distance between the protruding structure 19 and the inner edge 126n of the opening 126 is greater than about the width W3, but the present disclosure is not limited thereto. For example, the distance between the protruding structure 19 and the inner edge 126n of the opening 126 may be about twice of the width W3.

Since the thermal expansion coefficient of the frame 12 is greater than the thermal expansion coefficient of the display panel 10 as shown in FIG. 2A, a contact area between the adhesive structure 18 and the frame 12 may be reduced by the protruding structure 14 on the frame 12, thus reducing the difference between a contact area between the adhesive structure 18 and the display panel 10 and that between the adhesive structure 18 and the frame 12, such that the chances of the adhesive structures 18 being separated (peeled off) from the frame 12 and/or the display panel 10, thereby improving the strength of the overall structure of the display device 1 at the non-room temperature.

In some embodiments, a height H3 of the protruding structure 19 relative to the top surface 120t of the frame 12 is substantially equal to or is lower than the height H2 of the display panel 10 relative to the top surface 120t of the frame 12. In some embodiments, the height H3 of the protruding structure 19 relative to the top surface 120t of the frame 12 is lower than the height H2 of the display panel 10 relative to the top surface 120t of the frame 12.

In some embodiments, the height H3 of the protruding structure 19 relative to the top surface 120t of the frame 12 is higher than the sidewall 160 of the housing 16, but the present disclosure is not limited thereto. For example, a height of the protruding structure 19 relative to the top surface 120t of the frame 12 may be substantially equal to the sidewall 160 of the housing 16. In some embodiments, an area of a vertical projection of the protruding structures 19 on the top surface 120t of the frame 12 is smaller than about one half of the area of the top surface 120t, but the present disclosure is not limited thereto.

In some embodiments, the protruding structure 19 has side surface 192. The side surface 192 of the protruding structure 19 is not in contact with the adhesive structure 18 (see FIG. 3A). In addition, a portion of the frame 12 between the two adjacent protruding structures 19 is not in contact with the adhesive structure 18 (see FIG. 3A).

In FIG. 3B, the adhesive structure 18 as shown in FIG. 3A is sequentially adhered to the display surface 106 of the display panel 10, a top surface 190t of the protruding structure 19 located away from the frame 12, the side surface 160s of the sidewall 160, and the bottom plate 162 of the housing 16. The thickness T (see FIG. 3A) of the adhesive structure 18 is smaller than the height H3 of the protruding structure 19 relative to the frame 12.

In FIG. 2A and FIG. 3B, the backlight module 15 is disposed between the bottom plate 162 of the housing 16 and the supporting portion 122 of the frame 12. The backlight module 15 sequentially includes a light guiding plate 150 and an optical film 152 from the bottom plate 162 to the supporting portion 122. The backlight module 15 further includes reflective layer 154. The reflective layer 154 covers the light guiding plate 150 and a sidewall of the optical film 152. The supporting portion 122 of the frame 12 covers the outer edge 152 of the optical film 152.

In some embodiments, the light source (not shown) is disposed on the sidewall 120 of the frame 12 and is configured to provide light toward the light guiding plate 150, but the present disclosure is not limited thereto. In other embodiments, the light source 15 also may be placed at a desired position according to design requirements. The light of the light source 15 is guided by the light guiding plate 150 to provide the surface light source to the display panel 10. The optical film 152 may be a diffusion film, a brightness enhancement film, a composite film, or combination thereof. The reflective layer 154 is configured to reflect the light emitted by the light source to the display panel 10, thereby improving the luminous efficiency of the display panel 10.

Figure 4A:
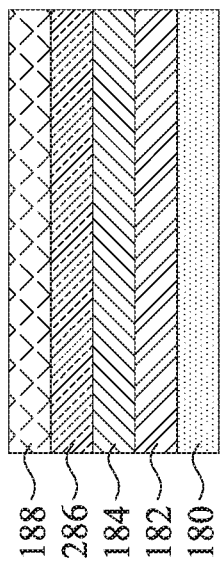
FIGS. 4A and 4B are cross-sectional views showing adhesive structures in accordance with some embodiments of the present disclosure, respectively.

Reference is made to FIG. 4A. FIG. 4A is cross-sectional views of adhesive structure 18 in accordance with some embodiments of the present disclosure. As shown in FIG. 4A, in some embodiments, the adhesive structure 18 includes an adhesive layer 180, a first molding layer 182, an electromagnetic shielding layer 184, and an insulating layer 188 which are sequentially stacked on each other. The adhesive layer 180 in the adhesive structure 18 is adhered to the display surface 106 of the display panel 10, the top surface 140t of the protruding structure 14 located away from the frame 12, the side surface 160s of the sidewall 160, and the bottom plate 162 of the housing 16. as shown in FIGS. 2A and 2B.

In some embodiments, the adhesive layer 180 in the adhesive structure 18 may be made of material including conductive adhesive. The first molding layer 182 of the adhesive structure 18 may include fiber structure. In some embodiments, the first molding layer 182 may include plant fibres. For example, the first molding layer 182 is impregnated with a fiber or a fiber cloth in a thermoplastic resin to form an impregnated discontinuous fiber cloth so that the thermoplastic resin fills the gap of the discontinuous fiber or the fiber cloth, and covers the entire surface of the continuous fiber cloth. Thereby, the first molding layer 182 may improve the conformability of the adhesive structure 18 on the display panel 10, the protruding structure 14 and the housing 16, such that the chances of the adhesive structures 18 being separated from the display panel 10, the protruding structure 14, and/or the housing 16 may be reduced.

In some embodiments, the electromagnetic shielding layer 184 of the adhesive structure 18 may be made of material including metal or any material that may be used as electromagnetic shielding. For example, the electromagnetic shielding layer 184 may include aluminum. The insulating layer 188 of the adhesive structure 18 may include insulating material. For example, the insulating layer 188 may include polyethylene terephthalate (PET). Thereby, the insulating layer 188 in the adhesive structure 18 may insulate the electromagnetic shielding layer 184 or the adhesive layer 180 from other components, thereby preventing the display device 1 from being short-circuited.

Figure 4B:
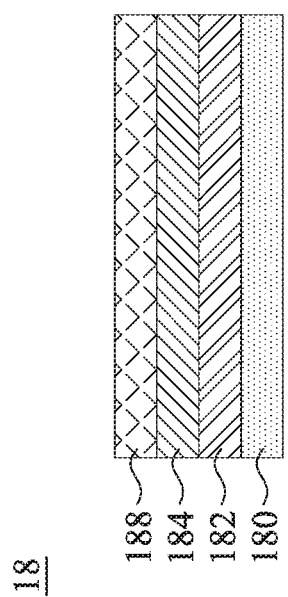

Reference is made to FIG. 4B. FIG. 4B is a cross-sectional view of adhesive structure 28 in accordance with some embodiments of the present disclosure. As shown in FIG. 4A, in some embodiments, the adhesive structure 18 includes the adhesive layer 180, the first molding layer 182, the electromagnetic shielding layer 184, a second molding layer 286, and the insulating layer 188 which are sequentially stacked on each other. The structure and function of the components and their relationships are substantially the same as the adhesive structure 18 shown in FIG. 4A, and the related detailed descriptions may refer to the foregoing paragraphs, and are not described again herein. It is noted that, the difference between the present embodiment and the embodiment in FIG. 4A is in that the adhesive structure 28 further includes the second molding layer 286. The second molding layer 286 of the adhesive structure 28 is disposed between the electromagnetic shielding layer 184 and the insulating layer 188. Thereby, the second molding layer 286 may further improve the conformability of the adhesive structure 28 on the display panel 10, the protruding structure 14 and the housing 16, such that the chances of the adhesive structures 28 being separated (peeled off) from the display panel 10, the protruding structure 14, and/or the housing 16 may be reduced.

Figure 5:
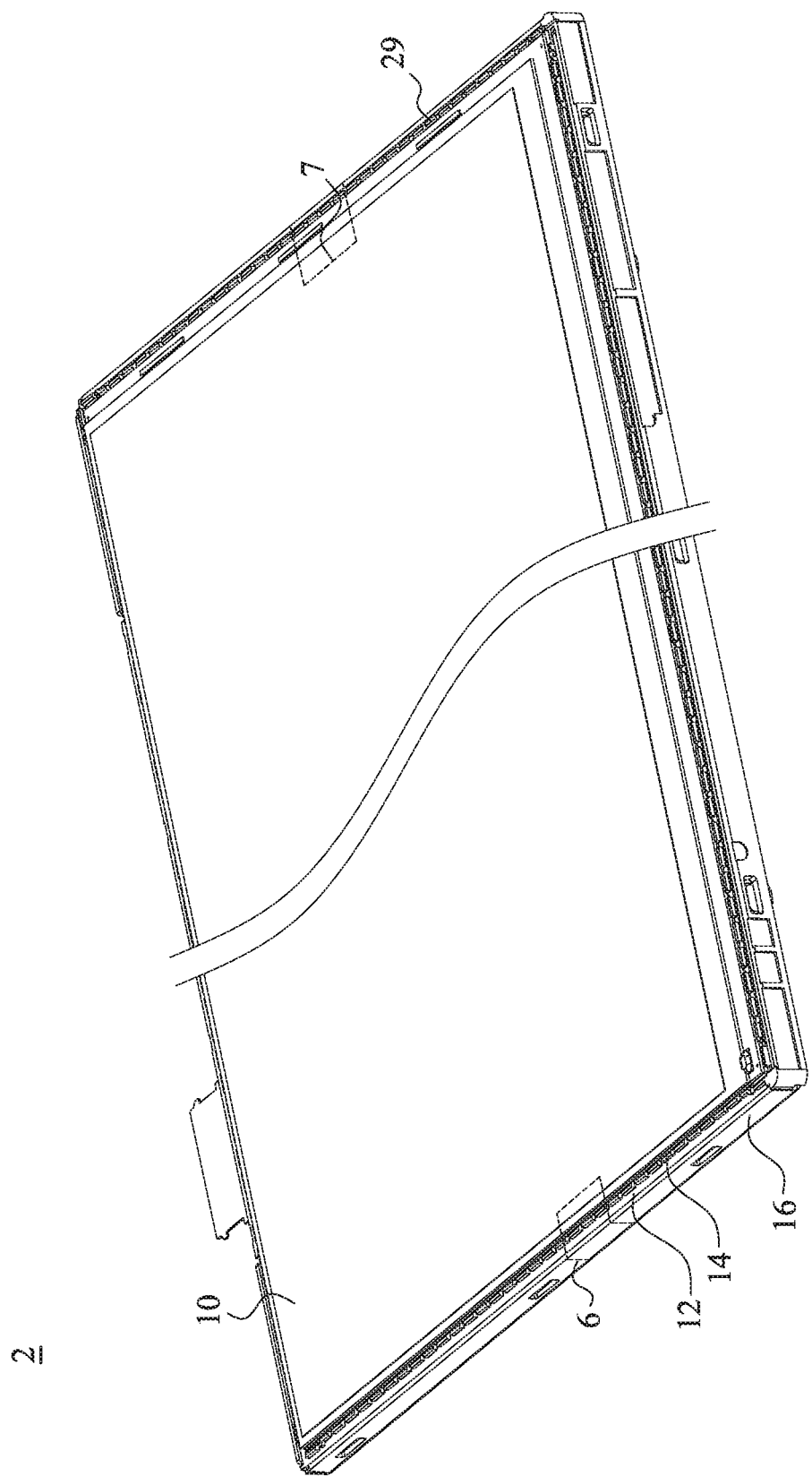
FIG. 5 is a partial perspective view showing a display device in accordance with some embodiments of the present disclosure, in which FIG. 5 omits an adhesive structure as shown in FIG. 1A.
Figure 6A:
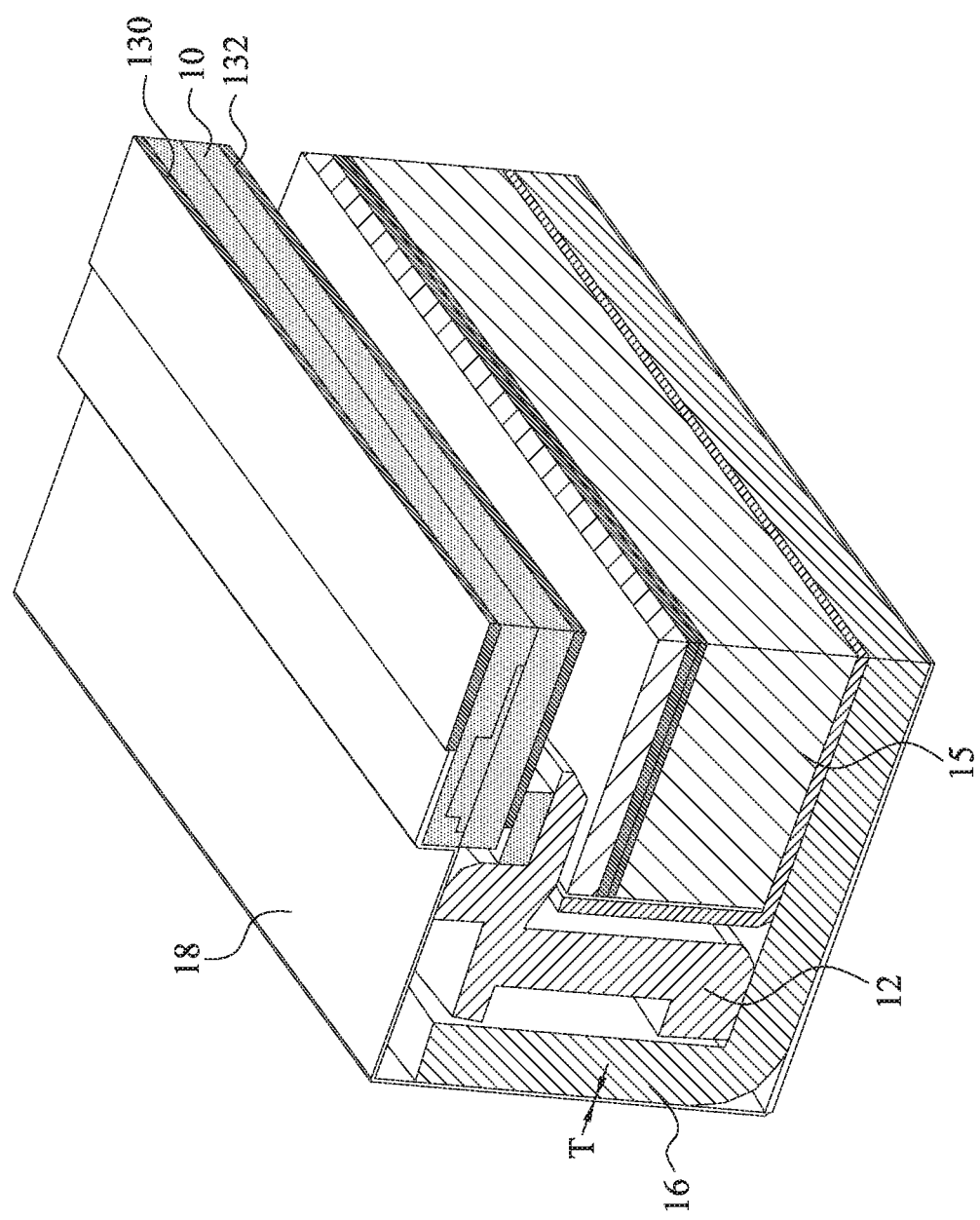
FIG. 6A is a partial perspective cross-sectional view taken along a broken line 6 in FIG. 5, in which FIG. 6A further includes an adhesive structure as shown in FIG. 1A in comparison with FIG. 5.
Figure 6B:
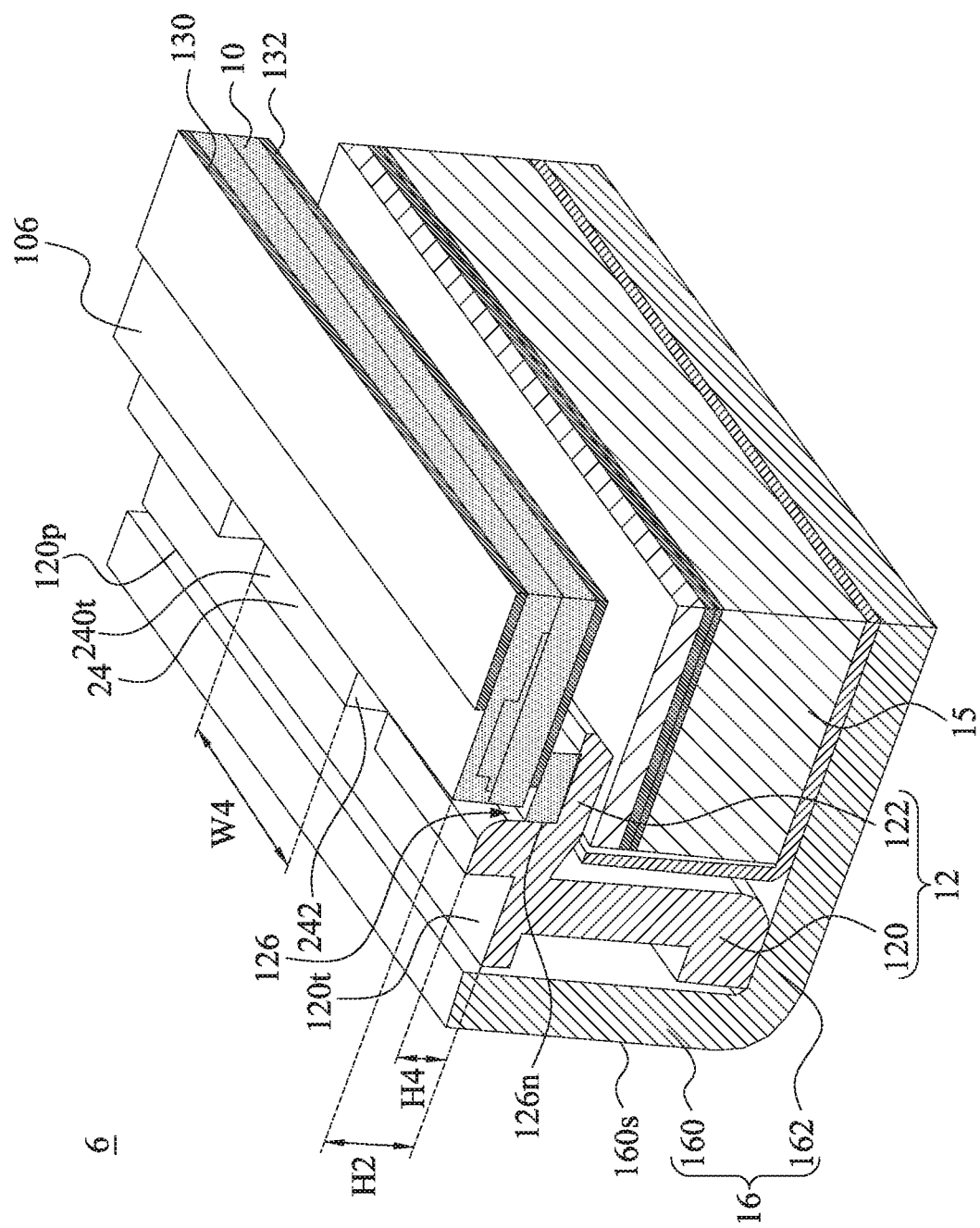
FIG. 6B is a partial perspective cross-sectional view taken along a broken line 6 in FIG. 5.
Figure 7A:
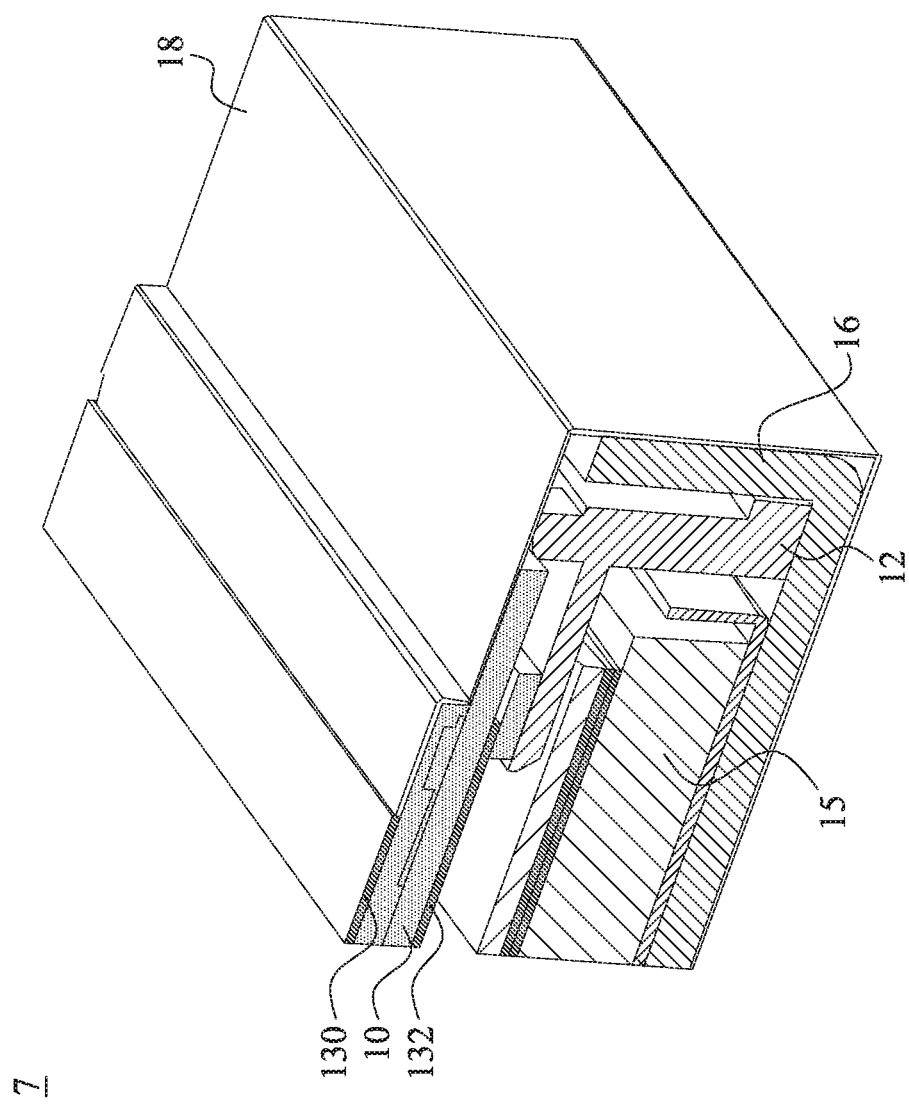
FIG. 7A is a partial perspective cross-sectional view taken along a broken line 7 in FIG. 5, in which FIG. 7A further includes an adhesive structure as shown in FIG. 1A in comparison with FIG. 5.
Figure 7B:
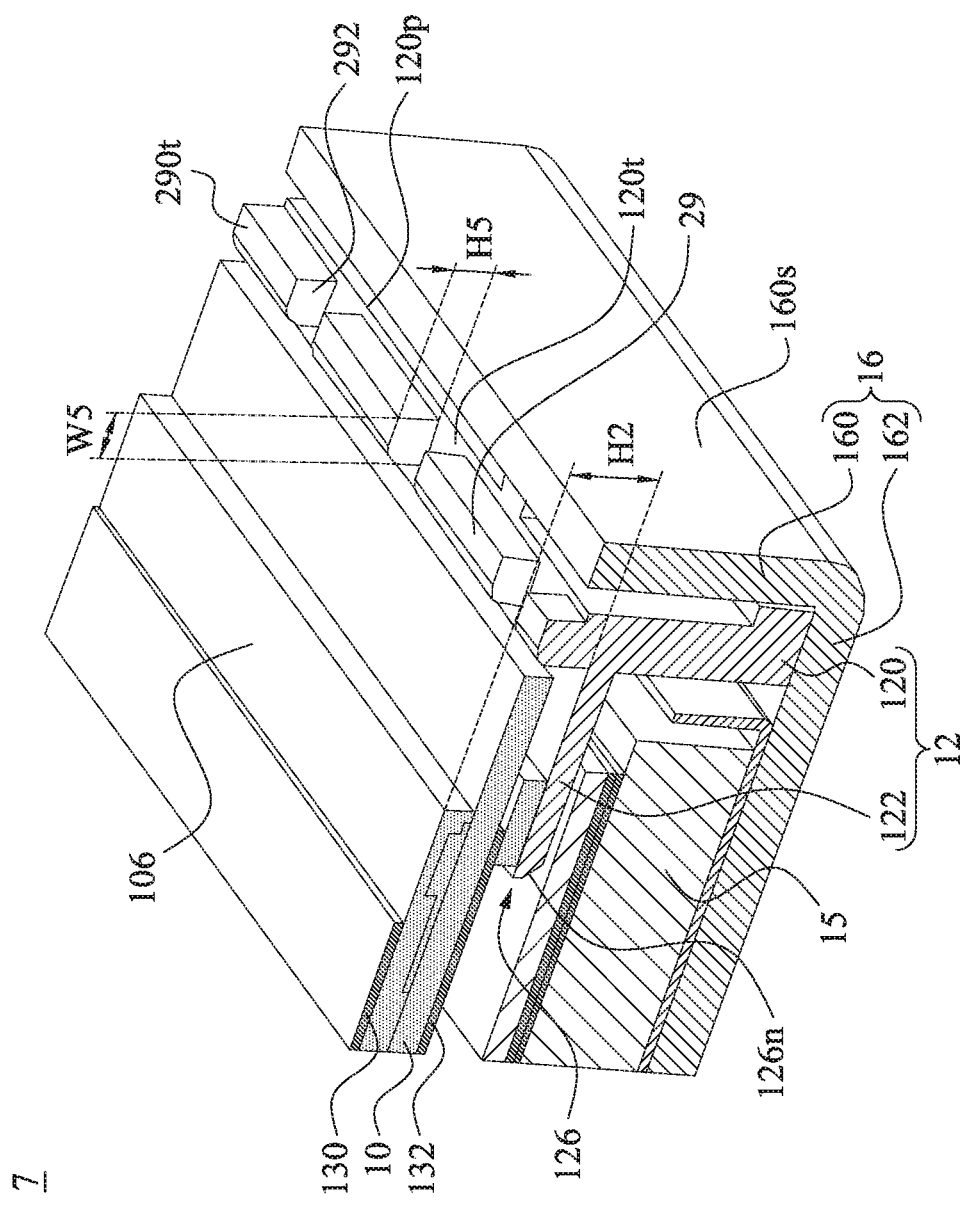
FIG. 7B is a partial perspective cross-sectional view taken along a broken line 7 in FIG. 5.

Reference is made to FIGS. 5, 6A, 6B, 7A, and 7B. FIG. 5 is a partial perspective view showing a display device 2 in accordance with some embodiments of the present disclosure, in which FIG. 5 omits the adhesive structure 18 as shown in FIG. 1A. FIG. 6A is a partial perspective cross-sectional view along broken line 6 in FIG. 5, in which FIG. 6A further includes the adhesive structure 18 as shown in FIG. 1A in comparison with to FIG. 5. FIG. 6B is a partial perspective cross-sectional view along broken line 6 in FIG. 5. FIG. 7A is a partial perspective cross-sectional view along broken line 7 in FIG. 5, in which FIG. 7A further includes the adhesive structure 18 as shown in FIG. 1A in comparison with to FIG. 5. FIG. 7B is a partial perspective cross-sectional view along broken line 7 in FIG. 5.

In some embodiments, the display device 2 includes the display panel 10, the frame 12, at least one protruding structure 24 (see FIG. 6B) protruded from and connected to the frame 12, the protruding structure 29 (see FIG. 7B), the adhesive structure 18 (see FIGS. 6A and 7A), the first substrate 130, the second substrate 132, the backlight module 15, and the housing 16. The structure and function of the components and their relationships are substantially the same as the display device 1 and the adhesive structure 18 shown in FIGS. 1A to 3B, and the related detailed descriptions may refer to the foregoing paragraphs, and are not described again herein.

It is noted that, the difference between the present embodiment and the embodiment in FIGS. 1A to 3B is in that the protruding structure 24 as shown in FIG. 6B is a strip protrusion along the inner edge 126n of the opening 126 of the frame 12 and the protruding structure 29 as shown in FIG. 7B is a strip protrusion along the outer edge 120p of the top surface 120t of the sidewall 120. Therefore, the present embodiment replaces the protruding structure 14 and the protruding structure 19 as shown in FIGS. 1A to 3B with the protruding structure 24 and the protruding structure 29.

In some embodiments, the protruding structure 24 has a height H4 relative to the top surface 120t of the frame 12 is substantially equal to or lower than the height H2 of the display panel 10 relative to the top surface 120t of the frame 12. Specifically, in FIG. 6B, the height H4 of the protruding structure 24 relative to the top surface 120t of the frame 12 is lower than the height H2 of the display panel 10 relative to the top surface 120t of the frame 12.

In some embodiments, the height H4 of the protruding structure 24 relative to the top surface 120t of the frame 12 is higher than the sidewall 160 of the housing 16 relative to the top surface 120t of the frame 12, but the present disclosure is not limited thereto. For example, the height H4 of the protruding structure 24 relative to the top surface 120t of the frame 12 may be substantially equal to the sidewall 160 of the housing 16 relative to the top surface 120t of the frame 12.

In some embodiments, the protruding structure 24 has a width W4 in a direction substantially perpendicular to the inner edge 126n of the opening 126. In some embodiments, a distance between the protruding structure 24 and the outer edge 120p of the top surface 120t of the sidewall 120 is greater than the width W4, but the present disclosure is not limited thereto. For example, the distance between the protruding structure 24 and the outer edge 120p of the top surface 120t of the sidewall 120 may be about twice the width W4. In some embodiments, an area of a vertical projection of the protruding structures 24 on the top surface 120t of the frame 12 is smaller than about one half of an area of the top surface 120t, but the present disclosure is not limited thereto. For example, the area of the vertical projection of the protruding structures 24 on the top surface 120t of the frame 12 may be about one third of the area of the top surface 120t.

In some embodiments, the protruding structure 24 has a side surface 242. The side surface 242 of the protruding structure 24 is not in contact with the adhesive structure 18 (see FIG. 6A). In addition, a portion of the frame 12 between the two adjacent protruding structures 24 is not in contact with the adhesive structure 18 (see FIG. 6A).

In FIG. 6B, the adhesive structure 18 as shown in FIG. 6A is sequentially adhered to the display surface 106 of the display panel 10, a top surface 240t of the protruding structure 24 located away from the frame 12, a side surface 160s of the sidewall 160, and the bottom plate 162 of the housing 16. The thickness T (see FIG. 6A) of the adhesive structure 18 is smaller than the height H4 of the protruding structure 24 relative to the frame 12.

In FIG. 7B, the protruding structure 29 has a width W5 in a direction substantially perpendicular to the outer edge 120p. In some embodiments, a distance between the protruding structure 29 and the inner edge 126n of the opening 126 is greater than about the width W5, but the present disclosure is not limited thereto. For example, the distance between the protruding structure 29 and the inner edge 126n of the opening 126 may be about twice the width W5.

In some embodiments, a height H5 of the protruding structure 29 relative to the top surface 120t of the frame 12 is substantially equal to or is lower than the height H2 of the display panel 10 relative to the top surface 120t of the frame 12. In some embodiments, the height H5 of the protruding structure 29 relative to the top surface 120t of the frame 12 is lower than the height H2 of the display panel 10 relative to the top surface 120t of the frame 12.

In FIG. 7B, the adhesive structure 18 as shown in FIG. 7A is sequentially adhered to the display surface 106 of the display panel 10, a top surface 290t of the protruding structure 29 located away from the frame 12, the side surface 160s of the sidewall 160, and the bottom plate 162 of the housing 16. The thickness T (see FIG. 7A) of the adhesive structure 18 is smaller than the height H5 of the protruding structure 29 relative to the frame 12.

In some embodiments, the protruding structure 29 has a side surface 292. The side surface 292 of the protruding structure 29 is not in contact with the adhesive structure 18 (see FIG. 7A). In addition, a portion of the frame 12 between two adjacent protruding structures 29 is not in contact with the adhesive structure 18 (see FIG. 7A).

In some embodiments, the height H5 of the protruding structure 29 relative to the top surface 120t of the frame 12 is higher than the sidewall 160 of the housing 16, but the present disclosure is not limited thereto. For example, a height of the protruding structure 29 relative to the top surface 120t of the frame 12 may be substantially equal to the sidewall 160 of the housing 16. In some embodiments, an area of a vertical projection of the protruding structures 29 on the top surface 120t of the frame 12 is smaller than about one half of the area of the top surface 120t, but the present disclosure is not limited thereto.

In some embodiments, the adhesive structure 18 simultaneously covers the display panel 10, the protruding structure 24, and/or the protruding structure 29 on the frame 12, such that the display panel 10 is connected to the frame 12 by the adhesive structure 18. Therefore, a contact area between the adhesive structure 18 and the frame 12 may be reduced by the protruding structure 24 and/or the protruding structure 29 on the frame 12, so as to reduce the difference between a contact area between the adhesive structure 18 and the display panel 10 and that between the adhesive structure 18 and the frame 12, such that the chances of the adhesive structures 18 being separated (peeled off) from the frame 12 and/or the display panel 10, thereby improving the strength of the overall structure of the display device 2 at the non-room temperature.

Figure 8:
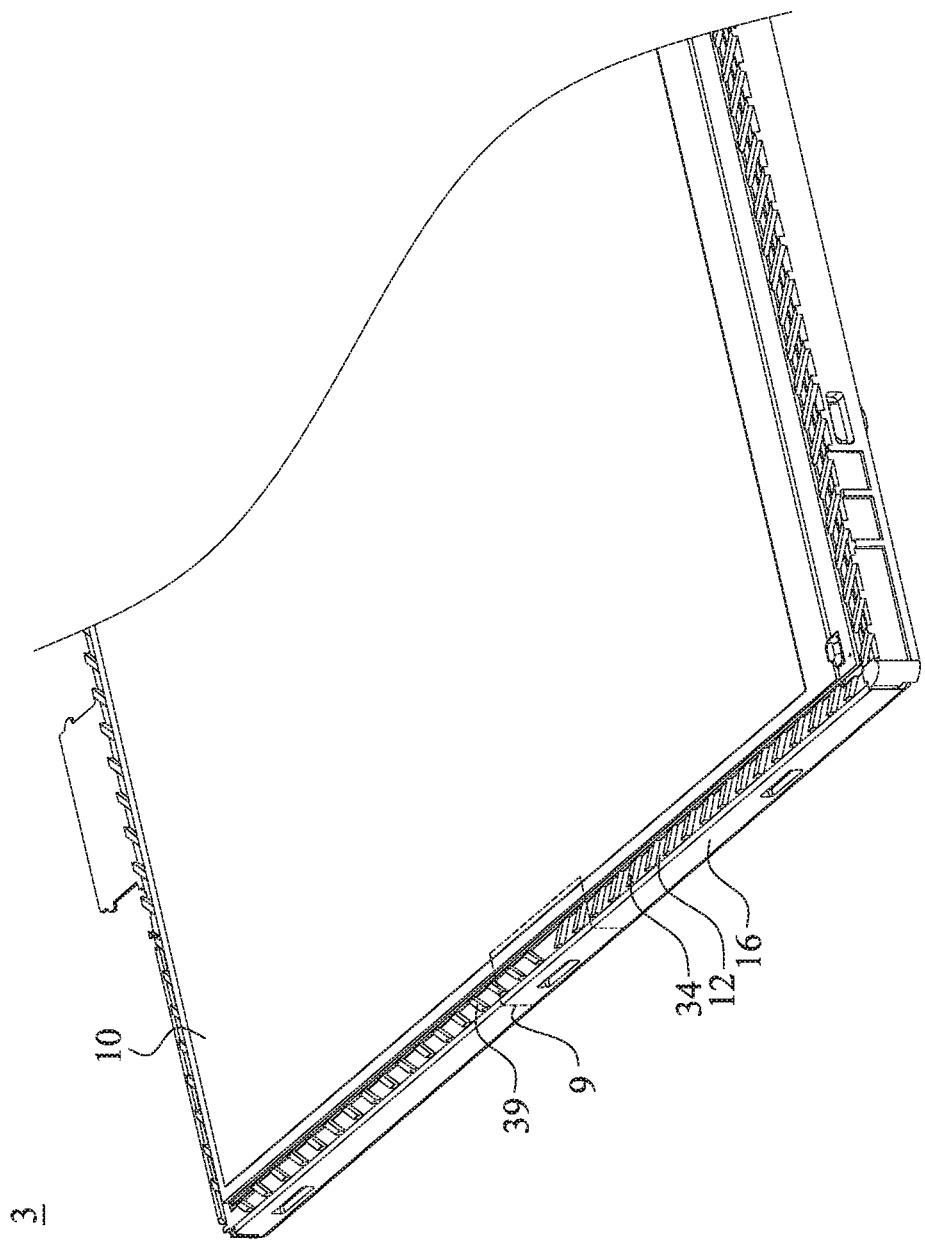
FIG. 8 is a partial perspective view showing a display device in accordance with some embodiments of the present disclosure, in which FIG. 8 omits an adhesive structure as shown in FIG. 1A.
Figure 9A:
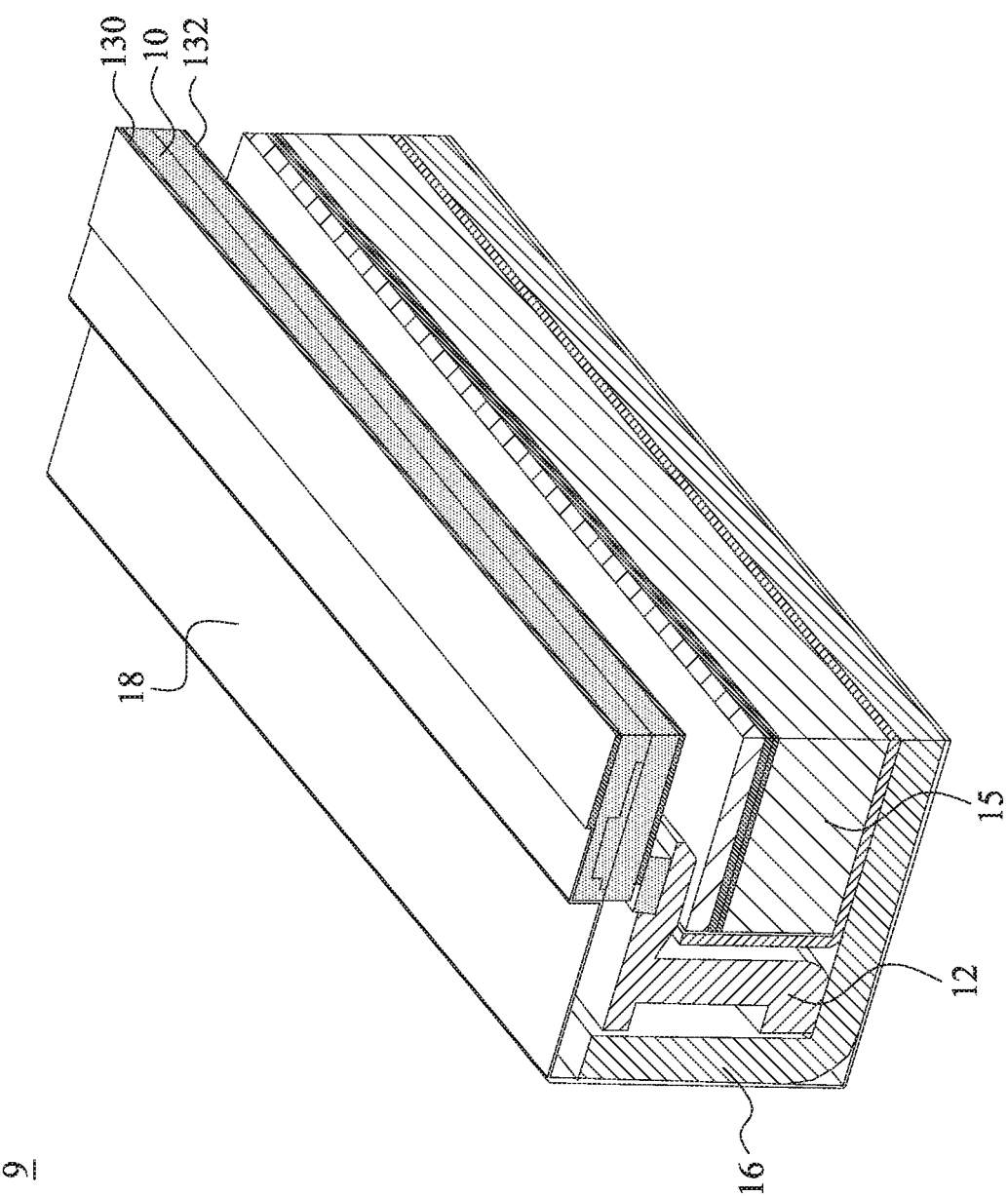
FIG. 9A is a partial perspective cross-sectional view taken along a broken line 9 in FIG. 8, in which FIG. 9A further includes an adhesive structure as shown in FIG. 1A in comparison with FIG. 5.
Figure 9B:
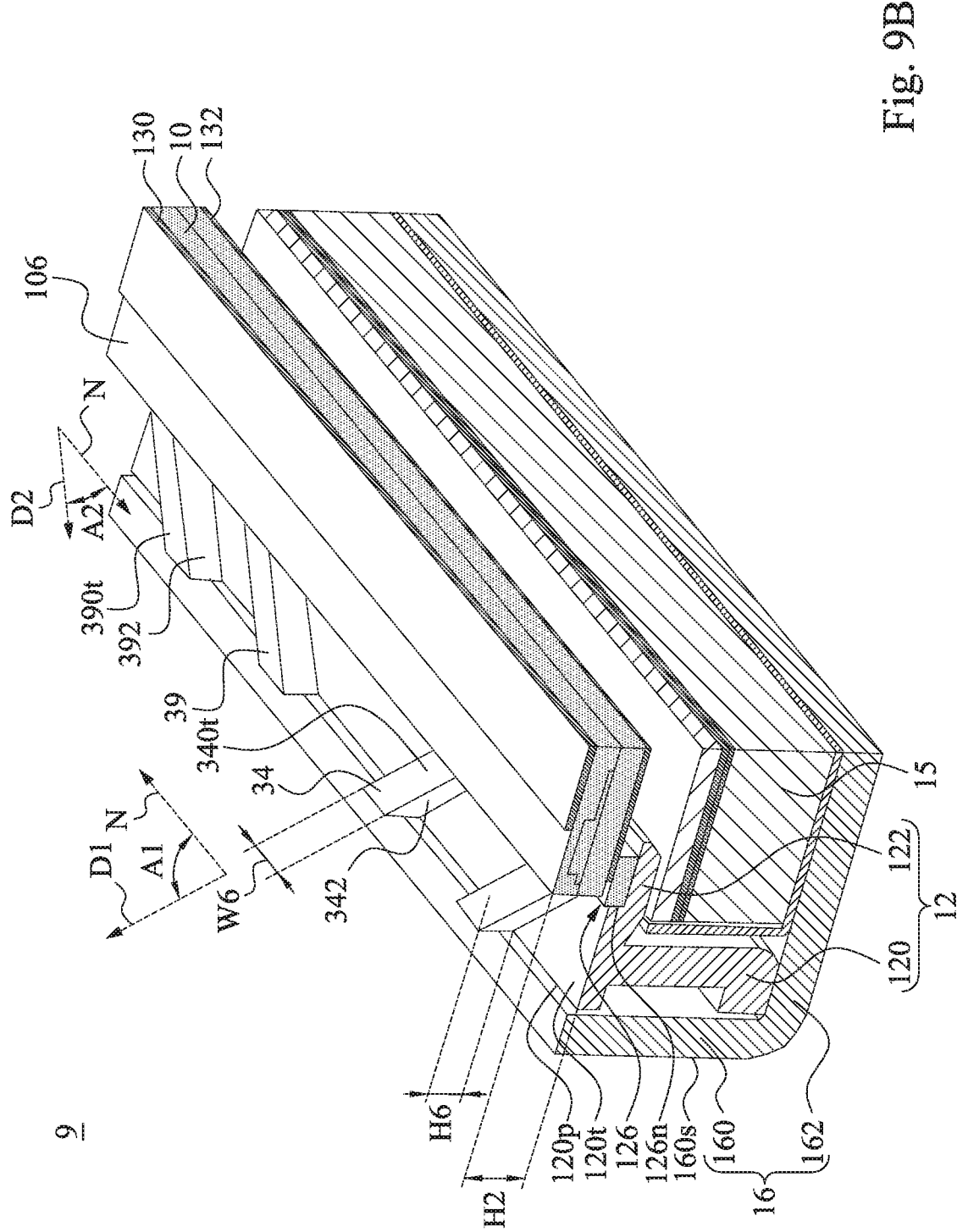
FIG. 9B is a partial perspective cross-sectional view taken along a broken line 9 in FIG. 8.

Reference is made to FIGS. 8, 9A, and 9B. FIG. 8 is a partial perspective view of a display device 3 in accordance with some embodiments of the present disclosure, in which FIG. 8 omits the adhesive structure 18 as shown in FIG. 1A. FIG. 9A is a partial perspective cross-sectional view taken along a broken line 9 in FIG. 8, in which FIG. 9A further includes the adhesive structure 18 as shown in FIG. 1A in comparison with to FIG. 5. FIG. 9B is a partial perspective cross-sectional view taken along the broken line 9 in FIG. 8.

In some embodiments, the display device 3 includes the display panel 10, the frame 12, the protruding structure 34 and the protruding structure 39 (see FIG. 9B) protruding from and connected to the frame 12, the adhesive structure 18 (see FIG. 9A), the first substrate 130, the second substrate 132, the backlight module 15, and the housing 16. The structure and function of the components and their relationships are substantially the same as those of the display device 1 and the adhesive structure 18 shown in FIGS. 1A to 3B, and the related detailed descriptions may refer to the foregoing paragraphs, and are not described again herein.

It is noted that, the difference between the present embodiment and the embodiment in FIGS. 1A to 3B is in that the protruding structure 34 as shown in FIG. 9B is a strip protrusion along the inner edge 126n of the opening 126 of the frame 12. The protruding structure 34 as shown in FIG. 9B is a strip protrusion extending along a first direction D1 intersecting the inner edge 126n of the opening 126 of the frame 12. The protruding structure 34 extends from the inner edge 126n of the opening 126 to the outer edge 120p of the top surface 120t of the sidewall 120. In addition, the protruding structure 39 as shown in FIG. 9B is a strip protrusion extending along a first direction D2 intersecting the inner edge 126n of the opening 126 of the frame 12. The protruding structure 39 extends from the inner edge 126n of the opening 126 to the outer edge 120p of the top surface 120t of the sidewall 120.

In some embodiments, the first direction D1 intersects an extending direction N of the inner edge 126n of the opening 126 of the frame 12 at a first angle A1. The second direction D2 intersects an extending direction N of the inner edge 126n of the opening 126 of the frame 12 at a first angle A2. The first angle A1 is substantially equal to the second angle A2. Therefore, the present embodiment replaces the protruding structured 14 as shown in FIGS. 1A to 3B with the protruding structure 34 and the protruding structure 39 and/or replaces the protruding structured 19 as shown in FIGS. 1A to 3B with the protruding structure 34 and the protruding structure 39.

Further, in FIG. 9B, the protruding structure 34 and/or the protruding structure 39 has a height H6 relative to the top surface 120t of the frame 12, and the height H6 is substantially equal to or lower than the height H2 of the display panel 10 relative to the top surface 120t of the frame 12. In some embodiments, the height H6 of the protruding structure 34 and/or the protruding structure 39 relative to the top surface 120t of the frame 12 is lower than the height H2 of the display panel 10 relative to the top surface 120t of the frame 12.

In some embodiments, the height H6 of the protruding structure 34 and/or the protruding structure 39 relative to the top surface 120t of the frame 12 is higher than the sidewall 160 of the housing 16 relative to the top surface 120t of the frame 12, but the present disclosure is not limited thereto. For example, the height H6 of the protruding structure 34 and/or the protruding structure 39 relative to the top surface 120t of the frame 12 may be substantially equal to the sidewall 160 of the housing 16 relative to the top surface 120t of the frame 12.

In FIG. 9B, the adhesive structure 18 as shown in FIG. 9A is sequentially adhered to the display surface 10s of the display panel 10, top surfaces 340t and 390t of the protruding structures 34 and 39 located away from the frame 12, the side surface 160s of the sidewall 160, and the bottom plate 162 of the housing 16. The thickness T (see FIG. 6A) of the adhesive structure 18 is smaller than the height H6 of the protruding structures 34 and 39 relative to the frame 12.

In some embodiments, the protruding structures 34 and 39 have side surfaces 342 and 392 respectively. The side surfaces 342 and 392 of the protruding structures 34 and 39 are not in contact with the adhesive structure 18 (see FIG. 6A). In addition, a portion of the frame 12 between the two adjacent protruding structures 34 is not in contact with the adhesive structure 18 (see FIG. 6A) and another portion of the frame 12 between the two adjacent protruding structures 39 is not in contact with the adhesive structure 18 (see FIG. 6A).

In some embodiments, the protruding structure 34 has a width W6 in a direction substantially perpendicular to the first direction D1. Alternatively, the protruding structure 39 has the width W6 in a direction substantially perpendicular to the second direction D2. In some embodiments, a distance between two adjacent protruding structures 34 is greater than about the width W6 and/or another distance between two adjacent protruding structures 39 is greater than about the width W6, but the present disclosure is not limited thereto. For example, the distance between the two adjacent protruding structures 34 may be about twice of the width W6 and/or the other distance between the two adjacent protruding structures 39 may be about twice of the width W6. In some embodiments, an area of a vertical projection of the protruding structures 34 and the protruding structures 39 on the top surface 120t of the frame 12 is smaller than about one half of an area of the top surface 120t, but the present disclosure is not limited thereto. For example, the area of the vertical projection of the protruding structures 34 and the protruding structures 39 on the top surface 120t of the frame 12 may be about one third of the area of the top surface 120t.

In some embodiments, the adhesive structure 18 simultaneously covers the display panel 10, the protruding structure 34, and the protruding structure 39 on the frame 12, such that the display panel 10 is connected to the frame 12 by the adhesive structure 18. Therefore, a contact area between the adhesive structure 18 and the frame 12 may be reduced by the protruding structure 34 and the protruding structure 39 on the frame 12, so as to reduce the difference between a contact area between the adhesive structure 18 and the display panel 10 and that between the adhesive structure 18 and the frame 12, such that the chances of the adhesive structures 18 being separated (peeled off) from the frame 12 and/or the display panel 10, thereby improving the strength of the overall structure of the display device 3 at the non-room temperature.

According to the foregoing embodiments of the disclosure, it may be seen that, the adhesive structure simultaneously covers the display panel and the protruding structure on the frame, such that the display panel is connected to the frame by the adhesive structure. Since the thermal expansion coefficient of the frame is different from the thermal expansion coefficient of the display panel, when the display device is at the non-room temperature, the frame and the display panel may push against each other through the adhesive structure, thus breaking a connection between the display panel, the frame and/or the adhesive structure. In some embodiments, a contact area between the adhesive structure and the frame may be reduced by the protruding structure on the frame, so as to reduce the difference between a contact area between the adhesive structure and the display panel and that between the adhesive structure and the frame, such that the chances of the adhesive structure being separated (peeled off) from the frame and/or the display panel may be reduced, thereby improving the strength of the overall structure of the display device at the non-room temperature.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display device, comprising:
   a display panel having a display surface;
   a frame surrounding the display panel and having an opening;
   a first strip protrusion protruding from the frame and substantially extending along a first direction that intersects an inner edge of the opening at a first angle;
   a second strip protrusion protruding from the frame and substantially extending along a second direction that intersects the inner edge of the opening at a second angle, wherein the second angle is substantially the same as the first angle and the second direction is different from the first direction; and
   an adhesive structure adhering to the display surface of the display panel and top surfaces of the first and second strip protrusions opposite to the frame.

2. The display device of claim 1, wherein the first strip protrusion has a side surface does not contact the adhesive structure.

3. The display device of claim 1, wherein a portion of the frame between the first and second strip protrusions does not contact the adhesive structure.

4. The display device of claim 1, wherein a first coefficient of thermal expansion of the display panel is smaller than a second coefficient of thermal expansion of the frame.

5. The display device of claim 1, wherein a first height of the first strip protrusion relative to the frame is substantially equal to or smaller than a second height of the display panel relative to the frame.

6. The display device of claim 1, wherein a thickness of the adhesive structure is smaller than a height of the first strip protrusion relative to the frame.

7. The display device of claim 1, wherein the adhesive structure comprises an adhesive layer, a first molding layer, an electromagnetic shielding layer, and an insulating layer which are sequentially stacked on each other, and the adhesive layer of the adhesive structure adheres to the display surface of the display panel and the top surfaces of the first and second strip protrusions.

8. The display device of claim 7, wherein the first molding layer is a fiber structure.

9. The display device of claim 7, wherein the adhesive structure further comprises a second molding layer between the electromagnetic shielding layer, and the insulating layer.

* * * * *